United States Patent
Nomaru et al.

(10) Patent No.: US 8,779,325 B2
(45) Date of Patent: Jul. 15, 2014

(54) LASER BEAM PROCESSING MACHINE

(75) Inventors: Keiji Nomaru, Tokyo (JP); Yutaka Kobayashi, Tokyo (JP); Hiroshi Morikazu, Tokyo (JP)

(73) Assignee: Disco Corporation, Tokyo (JP)

( * ) Notice: Subject to any disclaimer, the term of this patent is extended or adjusted under 35 U.S.C. 154(b) by 1386 days.

(21) Appl. No.: 12/073,271

(22) Filed: Mar. 3, 2008

(65) Prior Publication Data

US 2008/0217301 A1 Sep. 11, 2008

(30) Foreign Application Priority Data

Mar. 6, 2007 (JP) .................................. 2007-055342

(51) Int. Cl.
  *B23K 26/02* (2014.01)
  *B23K 26/00* (2014.01)

(52) U.S. Cl.
  CPC .................................. *B23K 26/0084* (2013.01)
  USPC .............. 219/121.61; 219/121.7; 219/121.71; 219/121.8; 219/121.78

(58) Field of Classification Search
  CPC ................................................... B23K 26/0084
  USPC ................. 219/121.8, 121.78, 121.6, 121.67, 219/121.68, 121.69, 121.7, 121.71, 121.72
  See application file for complete search history.

(56) References Cited

U.S. PATENT DOCUMENTS

| 5,623,473 | A | * | 4/1997 | Ichihara | 430/321 |
| 5,837,962 | A | * | 11/1998 | Overbeck | 219/121.68 |
| 6,130,402 | A | * | 10/2000 | Abella et al. | 219/121.68 |
| 6,857,365 | B2 | * | 2/2005 | Juffinger et al. | 101/401.1 |
| 6,972,392 | B2 | | 12/2005 | Kurosawa et al. | |
| 7,050,208 | B2 | * | 5/2006 | Overbeck | 359/201.1 |
| 2003/0019854 | A1 | * | 1/2003 | Gross et al. | 219/121.73 |
| 2003/0024912 | A1 | * | 2/2003 | Gross et al. | 219/121.74 |
| 2003/0042230 | A1 | * | 3/2003 | Gross et al. | 219/121.7 |
| 2007/0045254 | A1 | | 3/2007 | Morikazu | |

FOREIGN PATENT DOCUMENTS

| JP | 9-107168 | 4/1997 |
| JP | 63-66931 | 3/1998 |
| JP | 2000-126880 | 5/2000 |
| JP | 2003-163323 | 6/2003 |
| JP | 2004-188436 | 7/2004 |
| JP | 2005-251882 | 9/2005 |
| JP | 2006-82120 | 3/2006 |
| JP | 2007-67082 | 3/2007 |

OTHER PUBLICATIONS

Japanese Office Action issued on Jul. 3, 2012 for Application No. 2007-055342.
Japanese Office Action issued on Nov. 1, 2011 for Application No. 2007-055342.

* cited by examiner

*Primary Examiner* — Mark Paschall
(74) *Attorney, Agent, or Firm* — Smith, Gambrell & Russell LLP

(57) ABSTRACT

A laser beam processing machine includes a laser beam application device and a controller. The controller controls deflecting of the optical axis of a pulse laser beam from the laser beam application device in the processing-feed direction according to a plurality of processing position coordinates, and according to the frequency of the beam, to ensure that there is a predetermined time interval between pulses applied to the same processing position coordinates. One pulse is applied at a time to each of the plurality of processing position coordinates.

15 Claims, 7 Drawing Sheets

(a)

(b)

(a)

(b)

(a)

(b)

LASER BEAM PROCESSING MACHINE

FIELD OF THE INVENTION

The present invention relates to a laser beam processing machine capable of forming a via hole reaching a bonding pad (electrode) efficiently in a wafer having a plurality of devices on the front surface of a substrate and bonding pads (electrodes) on each of the devices, by applying a pulse laser beam from the rear surface of the substrate.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a device such as IC or LSI is formed in each of the sectioned areas. Individual semiconductor chips are manufactured by cutting this semiconductor wafer along the dividing lines to divide it into the areas in each of which a device is formed.

To reduce the size and increase the number of functions of an apparatus, a modular structure for connecting the electrodes of a plurality of semiconductor chips which are formed in a layer has been implemented and disclosed by JP-A 2003-163323, for example. This modular structure is such that through-holes (via holes) are formed at positions where electrodes are formed in the semiconductor wafer, and a conductive material such as aluminum for connecting the electrodes is filled up in the through-holes (via holes).

The via holes are generally formed in the above semiconductor wafer by a drill. However, the diameters of the via holes formed in the semiconductor wafer are as small as 30 to 100 μm and hence, drilling of the via holes is not always satisfactory in terms of productivity. In addition, the electrodes are as thick as about 1 to 5 μm. Therefore, the drilling must be controlled extremely accurately to form the via holes only in the substrate made of silicon that forms the wafer, without damaging the electrodes.

To solve the above problem, one of the applicants of the present application has proposed as JP-A 2007-67082 a method of efficiently forming a via hole reaching an electrode in a wafer having a plurality of devices on the front surface of a substrate and electrodes on each of the devices, by applying a pulse laser beam from the rear surface of the substrate.

The pulse laser beam used in the above method of drilling a wafer is set to an energy density that renders the efficient ablation processing of the substrate of the wafer but not the ablation processing of the electrode. However, in order to form a via hole reaching the electrode in the substrate of the wafer, a predetermined number of pulses of a pulse laser beam must be applied. When a via hole reaching the electrode is formed by applying a predetermined number of pulses of the pulse laser beam to the substrate of the wafer, heat generated by the application of the pulse laser beam accumulates in the electrode and reaches the melting point of the electrode, whereby there is caused a problem that the electrode melts and a hole is made in the electrode. Under the circumstance, the applicants of the present application has proposed, as Japanese patent application No. 2006-241269, a via hole forming method capable of forming a via hole reaching an electrode in the substrate of a wafer without melting the electrode by setting the time interval between pulses of a pulse laser beam to 150 μs or more.

When the time interval between pulses of the pulse laser beam is set to 150 μs or more, however, if the repetition frequency is set to 6,600 Hz or less or 6,600 Hz or more, the number of pulses to be applied to the workpiece must be thinned, which is not always satisfactory in terms of productivity.

SUMMARY OF THE INVENTION

It is an object of the present invention to provide a laser beam processing machine capable of forming a via hole reaching an electrode efficiently in the substrate of a wafer, without melting the electrode.

According to the present invention, the above object can be attained by a laser beam processing machine comprising a chuck table for holding a workpiece, a laser beam application means for applying a pulse laser beam to the workpiece held on the chuck table, a processing-feed means for moving the chuck table and the laser beam application means relative to each other in a processing-feed direction (X direction), an X-direction position detection means for the chuck table, and a controller for controlling the laser beam application means and the processing-feed means based on a detection signal from the X-direction position detection means, wherein the laser beam application means comprises a laser beam oscillation means for oscillating a pulse laser beam, an optical axis changing means for deflecting the optical axis of a pulse laser beam oscillated from the laser beam oscillation means in the processing-feed direction, and a condenser for converging a pulse laser beam whose optical axis has been deflected by the optical axis changing means; and the controller comprises a memory for storing a plurality of processing position coordinates set in the workpiece, controls the optical axis changing means according to the frequency of a pulse laser beam oscillated from the laser beam oscillation means and determines a plurality of predetermined processing position coordinates to be processed to ensure that the time interval between pulses of the pulse laser beam to be applied to the same processing position coordinates becomes a predetermined time or more when one pulse of the pulse laser beam is applied each time to a plurality of predetermined processing position coordinates to be processed sequentially and the pulse laser beam is applied to a plurality of predetermined processing position coordinates to be processed a predetermined number of times sequentially repeatedly.

The above optical axis changing means is composed of an acousto-optic deflection means which comprises an acousto-optic device for deflecting the optical axis of a pulse laser beam oscillated from the above laser beam oscillation means, an RF oscillator for applying RF to the acousto-optic device, and a deflection angle adjustment means for adjusting the frequency of RF outputted from the RF oscillator.

The above controller obtains the smallest integer (M) which satisfies $X \leq (1 \text{ sec}/N) \times M$ if $X > (1 \text{ sec}/N)$ and determines the number of predetermined processing position coordinates to be processed as M (wherein N (Hz) is the repetition frequency of a pulse laser beam oscillated from the laser beam oscillation means and X (sec) is the time interval).

Preferably, the time interval between pulses of a pulse laser beam to be applied to the same processing position coordinates is set to 150 μs or more.

In the laser beam processing machine of the present invention, one pulse of a pulse laser beam is applied each time to a plurality of predetermined processing position coordinates to be processed sequentially and a pulse laser beam is applied to a plurality of predetermined processing position coordinates to be processed a predetermined number of times sequentially repeatedly. Therefore, even when the repetition frequency of a pulse laser beam oscillated from the laser beam oscillation means is set to a large value, the time interval between pulses of a pulse laser beam applied to the same electrode position can be made a desired value or more, thereby making it possible to improve productivity.

DETAILED DESCRIPTION OF THE PREFERRED EMBODIMENT

A preferred embodiment of a laser beam processing machine constituted according to the present invention will be described in more detail hereinunder with reference to the accompanying drawings.

Figure 1:
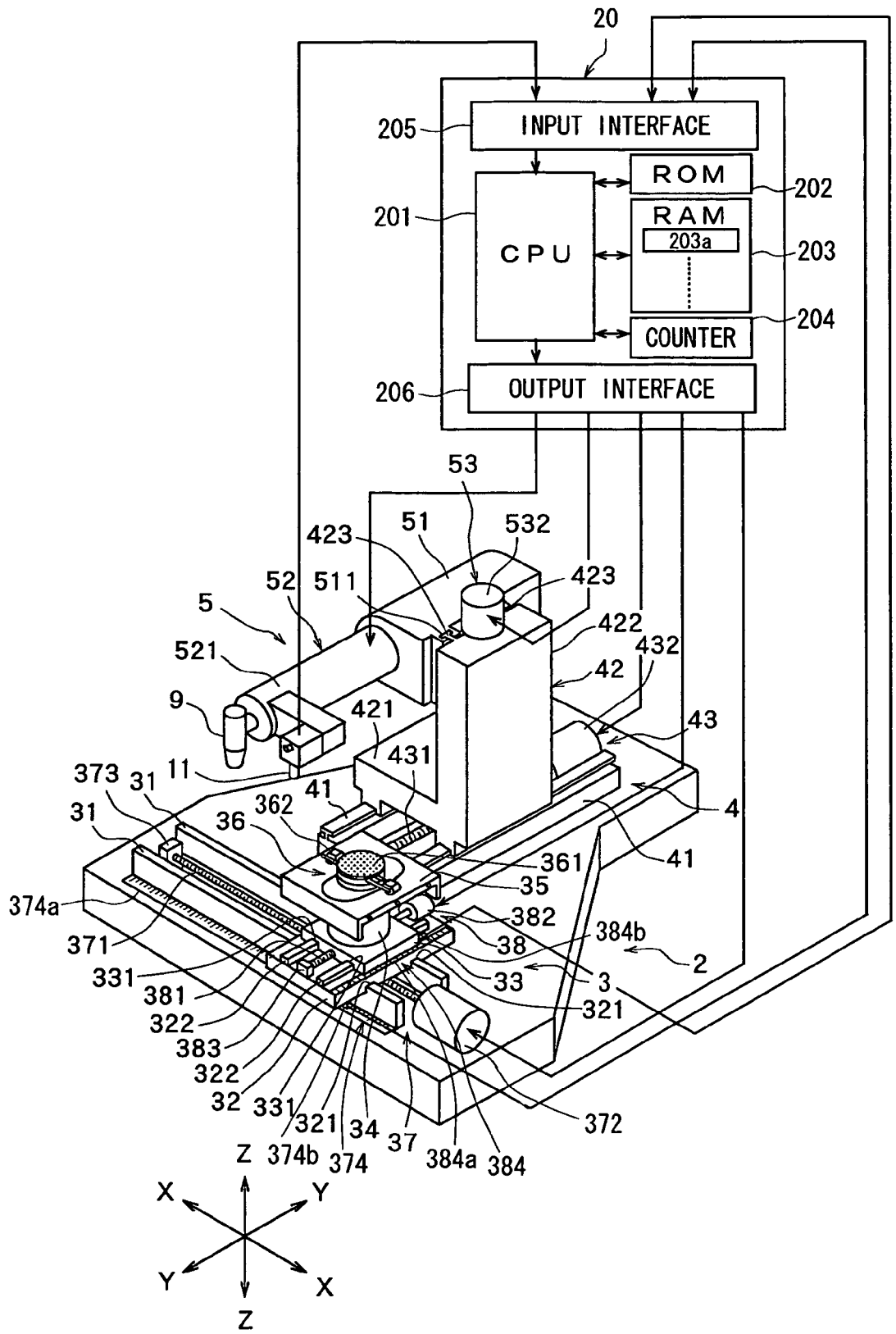
FIG. 1 is a perspective view of a laser beam processing machine constituted according to the present invention.

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction (X direction) indicated by an arrow X, a laser beam application unit support mechanism 4 mounted on the stationary base 2 in such a manner that it can move in an indexing-feed direction (Y direction) indicated by an arrow Y perpendicular to the processing-feed direction (X direction) indicated by the arrow X, and a laser beam application unit 5 mounted on the laser beam application unit support mechanism 4 in such a manner that it can move in a direction (Z direction) indicated by an arrow Z.

The above chuck table mechanism 3 comprises a pair of guide rails 31 and 31 which are mounted on the stationary base 2 and arranged parallel to each other in the processing-feed direction (X direction) indicated by the arrow X, a first sliding block 32 mounted on the guide rails 31 and 31 in such a manner that it can move in the processing-feed direction (X direction) indicated by the arrow X, a second sliding block 33 mounted on the first sliding block 32 in such a manner that it can move in the indexing-feed direction (Y direction) indicated by the arrow Y, a cover table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on the adsorption chuck 361 by a suction means that is not shown. The chuck table 36 constituted as described above is rotated by a pulse motor (not shown) installed in the cylindrical member 34. The chuck table 36 is provided with clamps 362 for fixing an annular frame which will be described later.

The above first sliding block 32 has, on the undersurface, a pair of to-be-guided grooves 321 and 321 to be fitted to the above pair of guide rails 31 and 31 and, has, on the top surface, a pair of guide rails 322 and 322 formed parallel to each other in the indexing-feed direction (Y direction) indicated by the arrow Y. The first sliding block 32 constituted as described above can move along the pair of guide rails 31 and 31 in the processing-feed direction (X direction) indicated by the arrow X by fitting the to-be-guided grooves 321 and 321 to the pair of guide rails 31 and 31, respectively. The chuck table mechanism 3 in the illustrated embodiment comprises a processing-feed means 37 for moving the first sliding block 32 along the pair of guide rails 31 and 31 in the processing-feed direction (X direction) indicated by the arrow X. The processing-feed means 37 has a male screw rod 371 which is arranged between the above pair of guide rails 31 and 31 parallel to them and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction (X direction) indicated by the arrow X.

The laser beam processing machine in the illustrated embodiment has a processing-feed amount detection means 374 for detecting the processing-feed amount of the above chuck table 36. The processing-feed amount detection means 374 is composed of a linear scale 374a which is arranged along the guide rail 31 and a read head 374b which is mounted on the first sliding block 32 and moves along the linear scale 374a together with the first sliding block 32. The read head 374b of this processing-feed amount detection means 374 supplies one pulse signal for every 1 μm to a control means which will be described later in the illustrated embodiment. The control means later described detects the processing-feed amount of the chuck table 36 by counting the input pulse signals. Therefore, the processing-feed amount detection means 374 functions as an X-direction position detection means for detecting the position in the X direction of the chuck table 36. When the pulse motor 372 is used as a drive source for the above processing-feed means 37, the processing-feed amount of the chuck table 36 can be detected by counting the drive pulses of the control means (later described) for outputting a drive signal to the pulse motor 372. When a servo motor is used as a drive source for the above processing-feed means 37, a pulse signal outputted from a rotary encoder for detecting the revolution of the servo motor is supplied to the control means (later described) which in turn counts the input pulse signals to detect the processing-feed amount of the chuck table 36.

The above second sliding block 33 has, on the undersurface. A pair of to-be-guided grooves 331 and 331 to be fitted to the pair of guide rails 322 and 322 on the top surface of the above first sliding block 32 and can move in the indexing-feed direction (Y direction) indicated by the arrow Y by fitting the to-be-guided grooves 331 and 331 to the pair of guide rails 322 and 322, respectively. The chuck table mechanism 3 in the illustrated embodiment has a first indexing-feed means 38 for moving the second sliding block 33 along the pair of guide rails 322 and 322 on the first sliding block 32 in the indexing-feed direction (Y direction) indicated by the arrow Y. The first indexing-feed means 38 comprises a male screw rod 381 which is arranged between the above pair of guide rails 322 and 322 parallel to them and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction (Y direction) indicated by the arrow Y.

The laser beam processing machine in the illustrated embodiment has an indexing-feed amount detection means 384 for detecting the indexing-feed amount of the above second sliding block 33. This indexing-feed amount detection means 384 is composed of a linear scale 384a which is arranged along the guide rail 322 and a read head 384b which is mounted on the second sliding block 33 and moves along the linear scale 384a together with the second sliding block 33. The read head 384b of the indexing-feed amount detection means 384 supplies one pulse signal for every 1 μm to the control means (later described) in the illustrated embodiment. The control means (later described) detects the indexing-feed amount of the chuck table 36 by counting the input pulse signals. Therefore, the indexing-feed amount detection means 384 functions as a Y-direction position detection means for detecting the position in the Y direction of the chuck table 36. When the pulse motor 382 is used as a drive source for the above first indexing-feed means 38, the indexing-feed amount of the chuck table 36 can be detected by counting the drive pulses of the control means (later described) for outputting a drive signal to the pulse motor 382. When a servo motor is used as a drive source for the above first indexing-feed means 38, a pulse signal outputted from a rotary encoder for detecting the revolution of the servo motor is supplied to the control means (later described) which in turn counts the input pulse signals to detect the indexing-feed amount of the chuck table 36.

The above laser beam application unit support mechanism 4 comprises a pair of guide rails 41 and 41 mounted on the stationary base 2 and arranged parallel to each other in the indexing-feed direction (Y direction) indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction (Z direction) indicated by the arrow Z on one of its flanks. The laser beam application unit support mechanism 4 in the illustrated embodiment has a second indexing-feed means 43 for moving the movable support base 42 along the pair of guide rails 41 and 41 in the indexing-feed direction (Y direction) indicated by the arrow Y. This second indexing-feed means 43 comprises a male screw rod 431 arranged between the above pair of guide rails 41 and 41 parallel to them and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by rotary-driving the male screw rod 431 in a normal direction or reverse direction with the pulse motor 432, the movable support base 42 is moved along the guide rails 41 and 41 in the indexing-feed direction (Y direction) indicated by the arrow Y.

The laser beam application unit 5 in the illustrated embodiment has a unit holder 51 and a laser beam application means 52 secured to the unit holder 51. The unit holder 51 has a pair of to-be-guided grooves 511 and 511 to be slidably fitted to the pair of guide rails 423 and 423 on the above mounting portion 422 and is supported in such a manner that it can move in the direction (Z direction) indicated by the arrow Z by fitting the to-be-guided grooves 511 and 511 to the above guide rails 423 and 423, respectively.

The laser beam application unit 5 in the illustrated embodiment has a moving means 53 for moving the unit holder 51 along the pair of guide rails 423 and 423 in the direction (Z direction) indicated by the arrow Z. The moving means 53 comprises a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction (Z direction) indicated by the arrow Z. In the illustrated embodiment, the laser beam application means 52 is moved up by driving the pulse motor 532 in the normal direction and moved down by driving the pulse motor 532 in the reverse direction.

Figure 2:
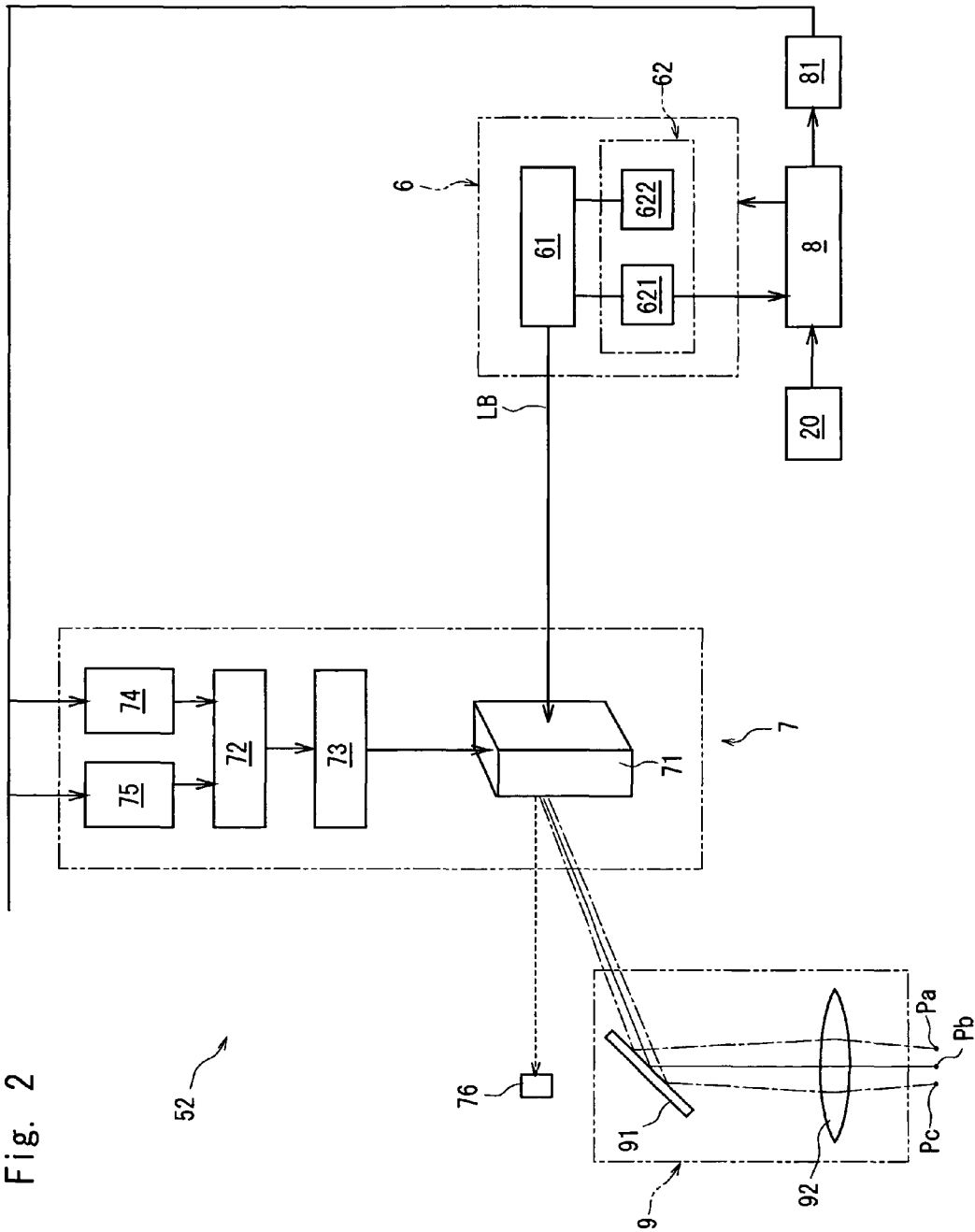
FIG. 2 is a block diagram of a laser beam application means provided in the laser beam processing machine shown in FIG. 1.

The above laser beam application means 52 comprises a cylindrical casing 521 arranged substantially horizontally, a pulse laser beam oscillation means 6 installed in the casing 521 as shown in FIG. 2, an acousto-optic deflection means 7 as an optical axis changing means for deflecting the optical axis of a laser beam oscillated by the pulse laser beam oscillation means 6 in the processing-feed direction (X direction), and a control means 8 for controlling the acousto-optic deflection means 7. The laser beam application means 52 further comprises a condenser 9 for applying a pulse laser beam passing through the acousto-optic deflection means 7 to the workpiece held on the above chuck table 36.

The above pulse laser beam oscillation means 6 is constituted by a pulse laser beam oscillator 61 composed of a YAG laser oscillator or YVO4 laser oscillator and a repetition frequency setting means 62 connected to the pulse laser beam oscillator 61. The pulse laser beam oscillator 61 oscillates a pulse laser beam having a predetermined frequency set by the repetition frequency setting means 62. The repetition frequency setting means 62 comprises an excitation trigger transmitter 621 and an oscillation trigger transmitter 622. In the pulse laser beam oscillation means 6 constituted as described above, the pulse laser beam oscillator 61 starts excitation based on an excitation trigger outputted from the excitation trigger transmitter 621 at predetermined intervals and oscillates a pulse laser beam based on an oscillation trigger outputted from the oscillation trigger transmitter 622 at predetermined intervals.

The above acousto-optic deflection means 7 comprises an acousto-optic device 71 for deflecting the optical axis of a laser beam oscillated from the pulse laser beam oscillation means 6 in the processing-feed direction (X direction), an RF oscillator 72 for generating RF (radio frequency) to be applied to the acousto-optic device 71, an RF amplifier 73 for amplifying the power of RF generated by the RF oscillator 72 to apply it to the acousto-optic device 71, a deflection angle adjustment means 74 for adjusting the frequency of RF generated by the RF oscillator 72 and an output adjustment means 75 for adjusting the amplitude of RF generated by the RF oscillator 72. The above acousto-optic device 71 can adjust the deflection angle of the optical axis of a pulse laser beam according to the frequency of the applied RF and the output of a pulse laser beam according to the amplitude of the applied RF. The above deflection angle adjustment means 74 and the above output adjustment means 75 are controlled by the control means 8.

The laser beam application means 52 in the illustrated embodiment comprises a laser beam absorbing means 76 for absorbing a laser beam deflected by the acousto-optic device 71 as shown by the broken line in FIG. 2 when RF having a predetermined frequency is applied to the above acousto-optic device 71.

The above control means 8 outputs a drive pulse signal corresponding to a pulse laser beam oscillated from the pulse laser beam oscillator 61 to a drive circuit 81 based on an excitation trigger output from the above excitation trigger transmitter 621 which is a repetition frequency setting signal from the repetition frequency setting means 62 of the pulse laser beam oscillation means 6. This drive circuit 81 applies a voltage corresponding to the drive pulse signal from the control means 8 to the deflection angle adjustment means 74 and the output adjustment means 75 of the above acousto-optic deflection means 7.

Returning to FIG. 1, the above condenser 9 is mounted on the end of the casing 521 and comprises a direction changing mirror 91 for changing the direction of a pulse laser beam which has been deflected by the above acousto-optic deflection means 7 as shown in FIG. 2 to a downward direction and a condenser lens 92 for converging a laser beam whose direction has been changed by the direction changing mirror 91.

The laser beam application means 52 in the illustrated embodiment is constituted as described above, and its function will be described with reference to FIG. 2.

When a voltage of, for example, 5 V is applied from the above drive circuit 81 to the deflection angle adjustment means 74 of the acousto-optic deflection means 7 to apply RF having a frequency corresponding to 5 V to the acousto-optic device 71, the optical axis of a pulse laser beam oscillated from the pulse laser beam oscillation means 6 is deflected as shown by the long dashed short dashed line in FIG. 2 and converged at a focusing point Pa. When a voltage of, for example, 10 V is applied from the above drive circuit 81 to the deflection angle adjustment means 74 to apply RF having a frequency corresponding to 10 V to the acousto-optic device 71, the optical axis of a pulse laser beam oscillated from the pulse laser beam oscillation means 6 is deflected as shown by the solid line in FIG. 2 and converged at a focusing point Pb which shifts from the above focusing point Pa a predetermined distance in the left direction of the processing-feed direction (X direction) in FIG. 2. When a voltage of, for example, 15 V is applied from the above drive circuit 81 to the deflection angle adjustment means 74 to apply RF having a frequency corresponding to 15 V to the acousto-optic device 71, the optical axis of a pulse laser beam oscillated from the pulse laser beam oscillation means 6 is deflected as shown by the long dashed double-short dashed line in FIG. 2 and converged at a focusing point Pc which shifts from the above focal point Pb a predetermined distance in the left direction of the processing-feed direction (X direction) in FIG. 2. Meanwhile, when a voltage of, for example, 0 V is applied from the above drive circuit 81 to the deflection angle adjustment means 74 of the acousto-optic deflection means 7 to apply RF having a frequency corresponding to 0 V to the acousto-optic device 71, a pulse laser beam oscillated from the pulse laser beam oscillation means 6 is guided to the laser beam absorbing means 76 as shown by the broken line in FIG. 2. Thus, a laser beam is deflected by the acousto-optic device 71 in the processing-feed direction (X direction) according to a voltage applied to the deflection angle adjustment means 74.

Returning to FIG. 1, the laser beam processing machine in the illustrated embodiment has an image pick-up means 11 which is attached to the end portion of the casing 521 and detects the area to be processed by the above laser beam application means 52. This image pick-up means 11 is constituted by an infrared illuminating means for applying infrared radiation to the workpiece, an optical system for capturing the infrared radiation applied by the infrared illuminating means and an image pick-up device (infrared CCD) for outputting an electric signal corresponding to the infrared radiation captured by the optical system in addition to an ordinary image pick-up device (CCD) for picking up an image with visible radiation. An image signal picked up is supplied to a controller which will be described later.

With further reference to FIG. 1, the laser beam processing machine in the illustrated embodiment has a controller 20. The controller 20 is composed of a computer which comprises a central processing unit (CPU) 201 for carrying out arithmetic processing based on a control program, a read-only memory (ROM) 202 for storing the control program etc., a read/write random access memory (RAM) 203 for storing a control map which will be described later, the design value data of the workpiece and the results of operations, a counter 204, an input interface 205 and an output interface 206. Detection signals from the above processing-feed amount detection means 374, the indexing-feed amount detection means 384 and the image pick-up means 11 are supplied to the input interface 205 of the controller 20. Control signals are supplied to the above pulse motor 372, the pulse motor 382, the pulse motor 432, the pulse motor 532, the pulse laser beam oscillation means 6 and the control means 8 from the output interface 206 of the controller 20. The above random access memory (RAM) 203 has a first storage area 203a for storing the design value data of the workpiece which will be described later and other storage areas.

The laser beam processing machine in the illustrated embodiment is constituted as described above, and its function will be described hereinunder.

Figure 3:
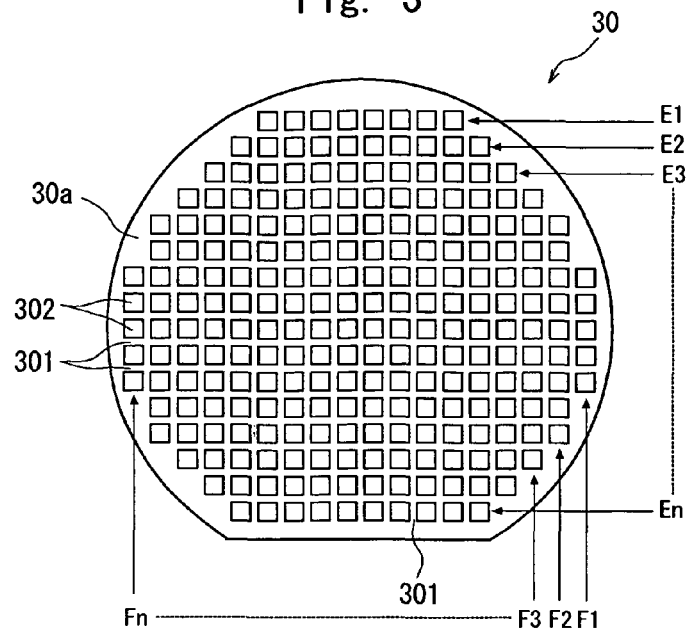
FIG. 3 is a plan view of a semiconductor wafer as a workpiece.
Figure 4:
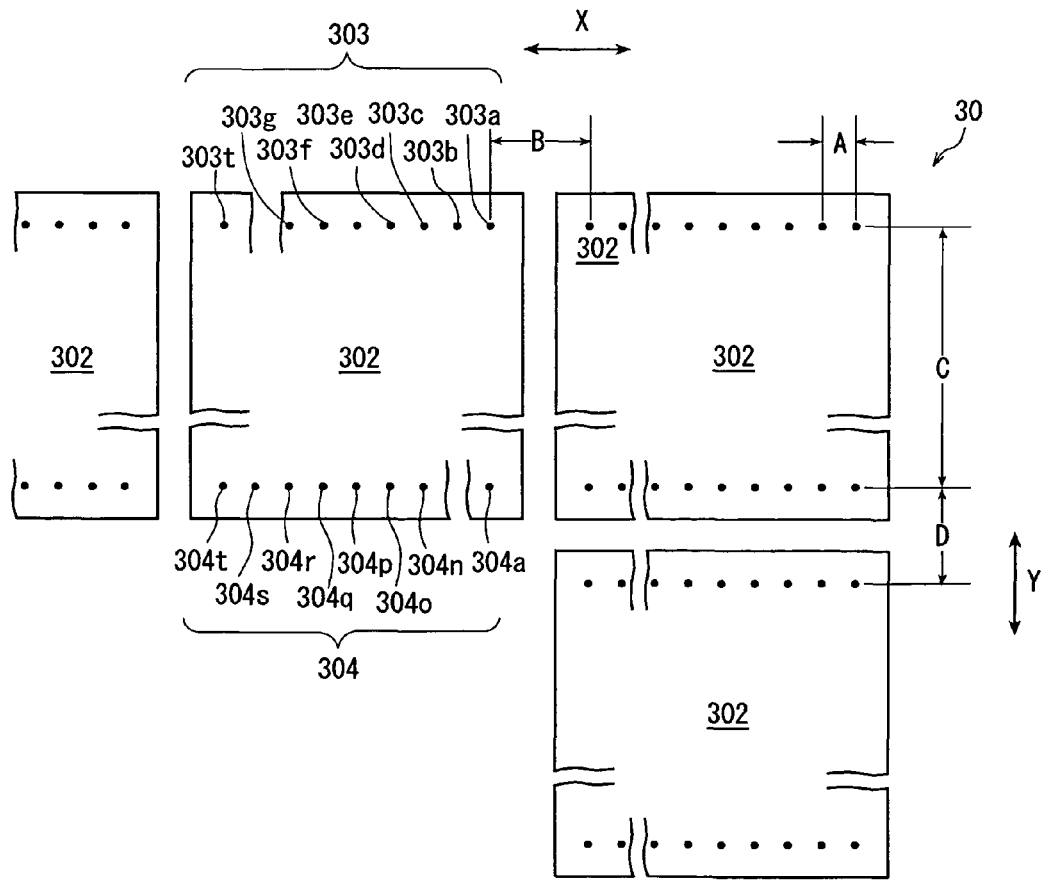
FIG. 4 is a partially enlarged plan view of the semiconductor wafer shown in FIG. 3.

FIG. 3 is a plan view of a semiconductor wafer 30 as the workpiece to be processed by a laser beam. The semiconductor wafer 30 shown in FIG. 3 is, for example, a silicon wafer having a thickness of 100 μm, a plurality of areas are sectioned by a plurality of dividing lines 301 formed in a lattice pattern on the front surface 30a, and a device 302 such as IC or LSI is formed in each of the sectioned areas. The devices 302 are all the same in constitution. Twenty electrodes 303 (303a to 303t) and twenty electrodes 304 (304a to 304t) are formed on the surface of each device 302 as shown in FIG. 4. In the illustrated embodiment, the electrodes 303 (303a to 303t) and 304 (304a to 304t) are formed at the same positions in the X direction. Via holes reaching the electrodes 303 and 304 are formed in portions corresponding to the plurality of electrodes 303 (303a to 303t) and 304 (304a to 304t) from the rear surface 30b. In the illustrated embodiment, twenty electrodes 303 (303a to 303t) and twenty electrodes 304 (304a to 304t) are respectively formed on each device 302, the intervals A between adjacent electrodes 303 (303a to 303t) and adjacent electrodes 304 (304a to 304t) in the X direction (horizontal direction in FIG. 4) are set to 100 µm, the intervals B between adjacent electrodes 303 (303a to 303t) and adjacent electrodes 304 (304a to 304t) formed on adjacent devices 302 in the X direction (horizontal direction in FIG. 4) with a dividing line 301 interposed therebetween, i.e., between electrodes 303t and 303a and between electrodes 304t and 304a are set to 350 µm, the intervals C between the electrodes 303 (303a to 303t) and the electrodes 304 (304a to 304t) formed on each device 302 in the Y direction (vertical direction in FIG. 4) are set to 1,900 µm, and the intervals D between the electrodes 304 and the electrodes 303 formed on adjacent devices 302 in the Y direction (vertical direction in FIG. 4) with a dividing line 301 interposed therebetween are set to 350 µm. The design value data of the semiconductor wafer 30 constituted as described above, which include the numbers of devices 302 disposed in rows E1 to En and columns F1 to Fn shown in FIG. 3 and the above intervals A, B, C and D, are stored in the first storage area 203a of the above random access memory (RAM) 203.

An embodiment of laser processing for forming via holes in portions corresponding to the electrodes 303 (303a to 303t) and 304 (304a to 304t) of each device 302 formed on the above semiconductor wafer 30 by using the above laser beam processing machine will be described hereinunder.

Figure 5:
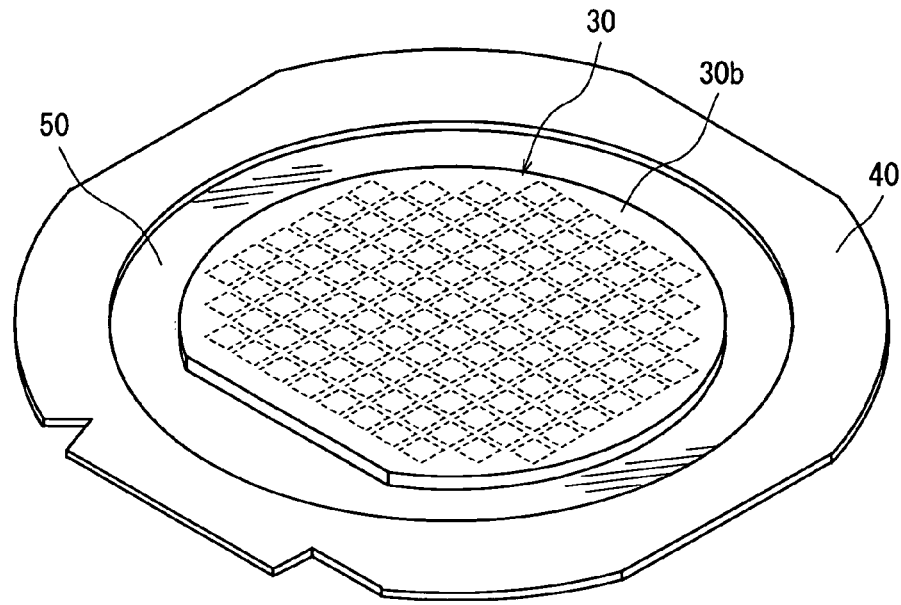
FIG. 5 is a perspective view showing a state of the semiconductor wafer shown in FIG. 3 being put on the surface of a protective tape mounted on an annular frame.

The front surface 30a side of the semiconductor wafer 30 constituted as described above is put on a protective tape 50 which is composed of a synthetic resin sheet such as a polyolefin sheet or the like and is mounted on an annular frame 40, as shown in FIG. 5. Therefore, the rear surface 30b of the semiconductor wafer 30 faces up. The protective tape 50 side of the semiconductor wafer 30 supported to the annular frame 40 through the protective tape 50 as described above is placed on the chuck table 36 of the laser beam processing machine shown in FIG. 1. And, the semiconductor wafer 30 is suction-held on the chuck table 36 through the protective tape 50 by activating the suction means that is not shown. The annular frame 40 is fixed by the clamps 362.

The chuck table 36 suction-holding the semiconductor wafer 30 as described above is brought to a position right below the image pick-up means 11 by the processing-feed means 37. After the chuck table 36 is positioned right below the image pick-up means 11, the semiconductor wafer 30 on the chuck table 36 becomes a state of being located at the coordinate position shown in FIG. 6. In this state, alignment work is carried out to check whether the dividing lines 301 formed in a lattice pattern on the semiconductor wafer 30 held on the chuck table 36 are arranged in parallel to the X direction and the Y direction. That is, an image of the semiconductor wafer 30 held on the chuck table 36 is picked up by the image pick-up means 11 to carry out image processing such as pattern matching, etc, for the alignment work. Although the front surface 30a, on which the dividing lines 301 are formed, of the semiconductor wafer 30 faces down at this point, as the image pick-up means 11 has an image pick-up means composed of an infrared illuminating means, an optical system for capturing infrared radiation and an image pick-up device (infrared CCD) for outputting an electric signal corresponding to the infrared radiation as described above, an image of the dividing lines 301 can be picked up through the rear surface 30b of the semiconductor wafer 30.

Thereafter, the chuck table 36 is moved to bring a device 302 at the most left end in FIG. 6 in the top row E1 out of the devices 302 formed on the semiconductor wafer 30 to a position right below the image pick-up means 11. Further, the upper left electrode 303a in FIG. 6 out of the electrodes 303 (303a to 303t) formed on the above device 302 is brought to a position right below the image pick-up means 11. After the image pick-up means 11 detects the electrode 303a in this state, its coordinate value (a1) is supplied to the controller 20 as a first processing-feed start position coordinate value. And, the controller 20 stores the coordinate value (a1) in the random access memory (RAM) 203 as a first processing-feed start position coordinate value (processing-feed start position detecting step). Since there is a predetermined space between the image pick-up means 11 and the condenser 9 of the laser beam application means 52 in the X direction at this point, a value obtained by adding the interval between the above image pick-up means 11 and the condenser 9 is stored as an X coordinate value.

Figure 6:
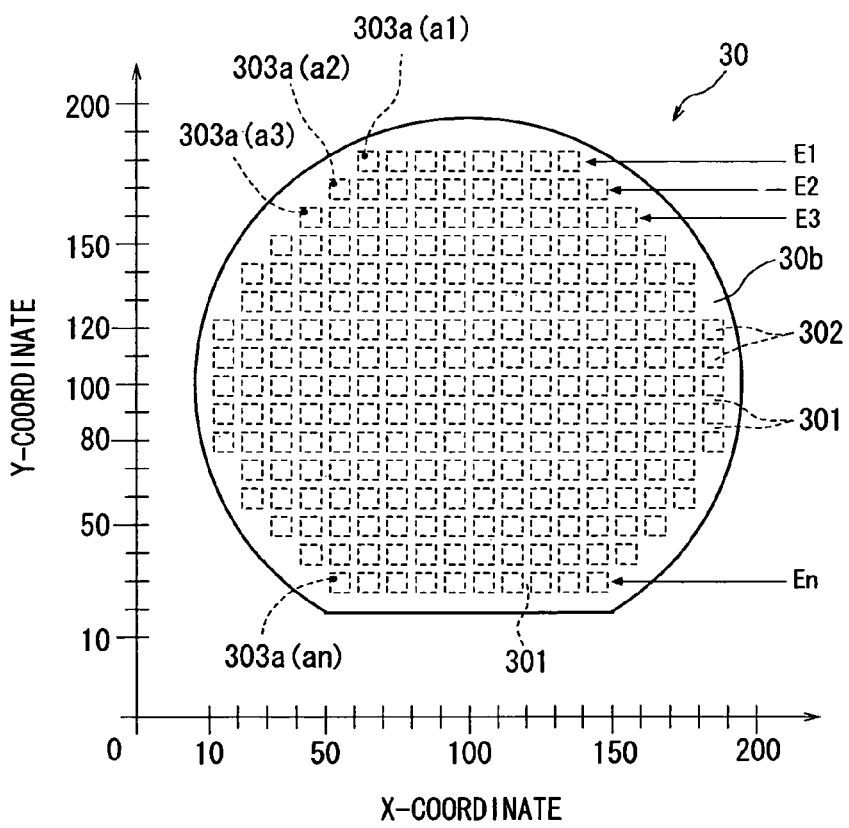
FIG. 6 is an explanatory diagram showing the relationship between the semiconductor wafer shown in FIG. 3 when it is held at a predetermined position of the chuck table of the laser beam processing machine shown in FIG. 1 and the coordinates.

After the first processing-feed start position coordinate value (a1) of the device 302 in the top row E1 in FIG. 6 is detected as described above, the chuck table 36 is moved a distance corresponding to the interval between dividing lines 301 in the Y direction and also moved in the X direction to bring a device 302 at the most left end in the second row E2 from the top in FIG. 6 to a position right below the image pick-up means 11. Further, the upper left electrode 303a in FIG. 6 out of the electrodes 303 (303a to 303t) formed on the above device 302 is brought to a position right below the image pick-up means 11. After the image pick-up means 11 detects the electrode 303a in this state, its coordinate value (a2) is supplied to the controller 20 as a second processing-feed start position coordinate value. The controller 20 stores the coordinate value (a2) in the random access memory (RAM) 203 as a second processing-feed start position coordinate value. Since there is the predetermined space between the image pick-up means 11 and the condenser 9 of the laser beam application means 52 in the X direction as described above, a value obtained by adding the interval between the image pick-up means 11 and the condenser 9 is stored as an X coordinate value. Thereafter, the controller 20 carries out each of the above indexing-feed start position detecting step and the processing-feed start position detecting step repeatedly up to the bottom row En in FIG. 6 to detect the processing-feed start position coordinate value (a3 to an) of the devices 302 formed in each row and store it in the random access memory (RAM) 203.

Figure 7:
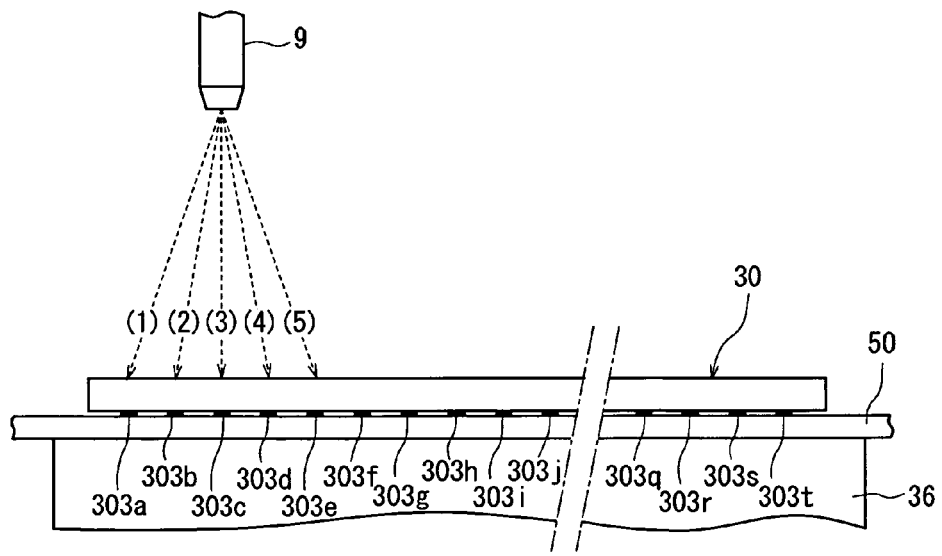
FIGS. 7(a) and 7(b) are explanatory diagrams showing the first cycle of a drilling step which is carried out by the laser beam processing machine shown in FIG. 1.
Figure 7:
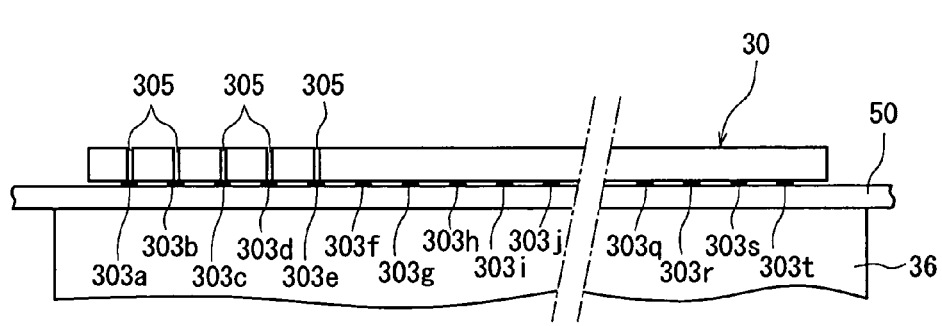

Next comes the step of drilling a via hole in portions corresponding to the electrodes 303 (303a to 303t) and 304 (304a to 304t) formed on each device 302 of the semiconductor wafer 30. In the drilling step, the processing-feed means 37 is first activated to move the chuck table 36 so as to bring the portion corresponding to the electrode 303a of the first processing-feed start position coordinate value (a1) stored in the above random access memory (RAM) 203 to a position right below the condenser 9 of the laser beam application means 52. In the illustrated embodiment, the chuck table 36 is further moved to bring the portion corresponding to the electrode 303c to a position right below the condenser 9 as shown in FIG. 7(a). Then, the controller 20 activates the laser beam application means 52 to output a control signal for controlling the deflection angle adjustment means 74 and the output adjustment means 75 of the acousto-optic deflection means 7 to the above control means 8.

That is, the controller 20 outputs a control signal for controlling a voltage to be applied to the deflection angle adjustment means 74 to the above control means 8 with respect to each pulse of a pulse laser beam oscillated from the above pulse laser beam oscillator 61. In the illustrated embodiment, the controller 20 outputs a control signal for deflecting the first pulse of a pulse laser beam oscillated from the pulse laser beam oscillator 61 at an angle which ensures that a pulse laser beam (1) is applied from the condenser 9 to the portion corresponding to the electrode 303a as exaggeratingly shown in FIG. 7(a). Then, the controller 20 outputs a control signal for deflecting the second pulse of a pulse laser beam oscillated from the pulse laser beam oscillator 61 at an angle which ensures that a pulse laser beam (2) is applied from the condenser 9 to the portion corresponding to the electrode 303b as shown in FIG. 7(a). Thereafter, the controller 20 outputs a control signal for deflecting the third pulse of a pulse laser beam oscillated from the pulse laser beam oscillator 61 at an angle which ensures that a pulse laser beam (3) is applied to the portion corresponding to the electrode 303c, a control signal for deflecting the fourth pulse at an angle which ensures that a pulse laser beam (4) is applied to the portion corresponding to the electrode 303d, and a control signal for deflecting the fifth pulse at an angle which ensures that a pulse laser beam (5) is applied to the portion corresponding to the electrode 303e sequentially. And, after the sixth pulse, the controller 20 outputs control signals for deflecting five pulses sequentially each time at angles which ensure that the respective pulses of a pulse laser beam oscillated from the pulse laser beam oscillator 61 are applied to the portions corresponding to the electrodes 303a to 303e. Therefore, a pulse laser beam oscillated from the pulse laser beam oscillator 61 is applied to each of the portions corresponding to the electrodes 303a to 303e every 5 pulses.

Meanwhile, the controller 20 outputs a control signal for controlling the output adjustment means 75 of the acousto-optic deflection means 7 to the above control means 8 so as to control the output of a pulse laser beam oscillated from the pulse laser beam oscillator 61 to a predetermined value. The energy density per pulse of the pulse laser beam is desirably set to 20 to 40 J/cm$^2$ which renders the ablation processing of a silicon wafer but not the ablation processing of electrodes made of metal.

The processing conditions in the above drilling step are set as follows, for example.

Light source: LD excited Q switch Nd: YVO4 pulse laser
Wavelength: 355 nm
Repetition frequency: 30 kHz
Energy density per pulse: 40 J/cm$^2$
Focusing spot diameter: 30 μm When the drilling step is carried out under the above processing conditions, a via hole having a depth of about 2 μm per one pulse of a pulse laser beam can be formed in the silicon wafer. Therefore, to form a via hole reaching the electrode 303 in the silicon wafer having a thickness of 100 μm, 50 pulses of the pulse laser beam must be applied. By applying 50 pulses of the pulse laser beam to the respective portions corresponding to the electrodes 303a to 303e, via holes 305 reaching the electrodes 303a to 303e can be formed as shown in FIG. 7(b). Thus, one cycle of the drilling step is over.

A description will be subsequently given of the time interval between pulse laser beams applied to the portions corresponding to the electrodes 303a to 303e under the above processing conditions.

Since the repetition frequency of a pulse laser beam oscillated from the pulse laser beam oscillator 61 is 30 kHz, the pulse interval is $1/30000$ sec. In the above embodiment, as a pulse laser beam oscillated from the pulse laser beam oscillator 61 is applied to each of the portions corresponding to the electrodes 303a to 303e every 5 pulses, the time interval between pulses applied to each electrode is $5/30000$ sec. According to experiments conducted by the inventors of the present invention, it was found that, when the time interval between pulses of the pulse laser beam is 150 μs or more, heat generated by the applied pulse is cooled before the next pulse is applied, thereby making it possible to form a via hole reaching the electrode in the silicon wafer without melting the electrode. Therefore, in the above embodiment, as the time interval between pulses of the pulse laser beam applied to each of the portions corresponding to the electrodes 303a to 303e is $5/30000$ sec (about 167 μs), a via hole reaching the electrode 303 can be formed in the semiconductor wafer 30 without melting the electrode 303. Thus, in the above embodiment, even when the repetition frequency of a pulse laser beam oscillated from the pulse laser beam oscillator 61 is set to 30,000 Hz which is much higher than 6,600 Hz, the time interval between pulses of the pulse laser beam applied to the same electrode position can be made 150 μs or more, thereby making it possible to improve productivity.

A description will be subsequently given of the number of predetermined positions to be processed in one cycle of the drilling step.

That is, the above controller 20 obtains the smallest integer (M) which satisfies X≤(1 sec/N)×M and determines the number of predetermined processing position coordinates to be processed as M if X>(1 sec/N) (wherein N (Hz) is the repetition frequency of a pulse laser beam oscillated from the above pulse laser beam oscillation means 6 and X (sec) is the time interval between pulses of the pulse laser beam applied to the same processing position coordinates). Therefore, when the number of pulses of a pulse laser beam applied to the same processing position coordinates is represented by Y (shots), Y shots of a pulse laser beam are applied every M pulses to the same processing position coordinates. To confirm the number of predetermined processing positions in the above embodiment, when the repetition frequency N of a pulse laser beam oscillated from the above pulse laser beam oscillation means 6 is 30 KHz (30,000 Hz) and the time interval between pulses of the pulse laser beam applied to the same processing position coordinates is 150 μs ($150/1000000$ sec), as X>(1 sec/N), the smallest integer (M) which satisfies ($150/1000000$)≤($1/30000$)×M is 5. It is thus determined that the number of predetermined processing positions to be processed is 5.

After via holes 305 reaching the electrodes 303a to 303e are formed in the portions corresponding to the electrodes 303a to 303e by carrying out one cycle of the drilling step, the above controller 20 outputs a control signal to the above control means 8 so as to send a drive pulse signal for applying a voltage of 0 V to the deflection angle adjustment means 74 of the acousto-optic deflection means 7. As a result, RF having a frequency corresponding to 0 V is applied to the acousto-optic device 71 and a pulse laser beam oscillated from the pulse laser beam oscillation means 6 is guided to the laser beam absorbing means 76 as shown by the broken line in FIG. 2 and hence, is not applied to the semiconductor wafer 30.

Figure 8:
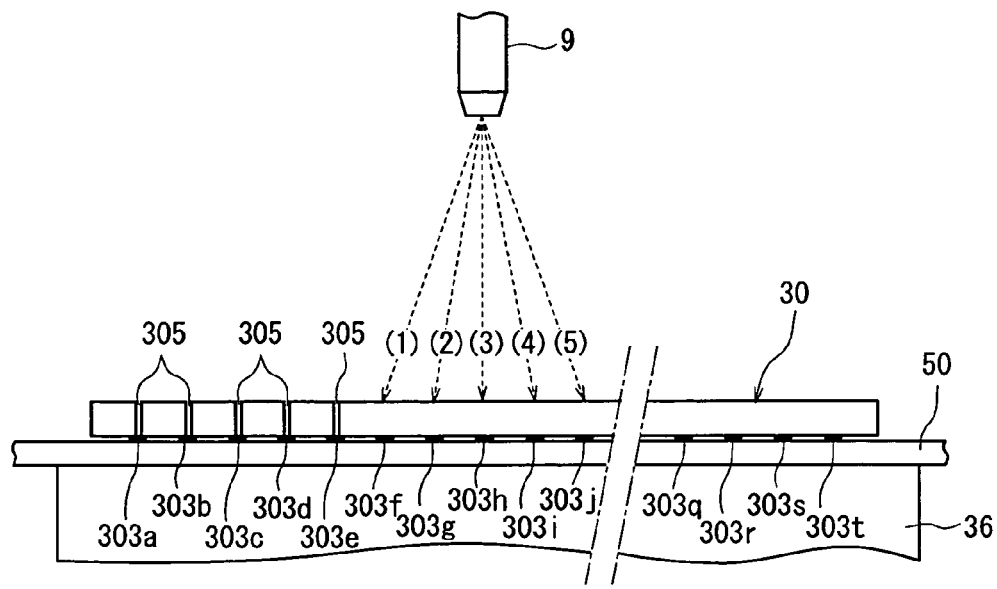
FIGS. 8(a) and 8(b) are explanatory diagrams showing the second cycle of the drilling step which is carried out by the laser beam processing machine shown in FIG. 1.
Figure 8:
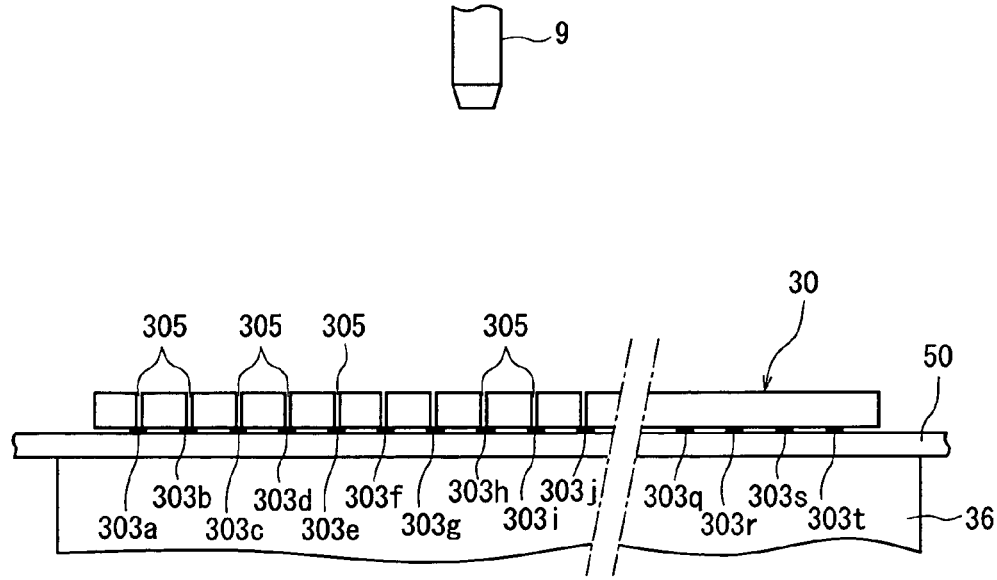

Thereafter, the chuck table 36 is moved in the left direction in FIG. 7(a) to bring a portion corresponding to the electrode 303h to a position right below the condenser 9 as shown in FIG. 8(a). By carrying out the above drilling step, via holes 305 reaching the electrodes 303f to 303j are formed in the portions corresponding to the electrodes 303f to 303j of the semiconductor wafer 30 as shown in FIG. 8(b). By repeating this drilling step four times, via holes 305 reaching the electrodes 303 (303a to 303t) are formed in the portions corresponding to the 20 electrodes (303a to 303t) formed on one device 302.

Figure 9:
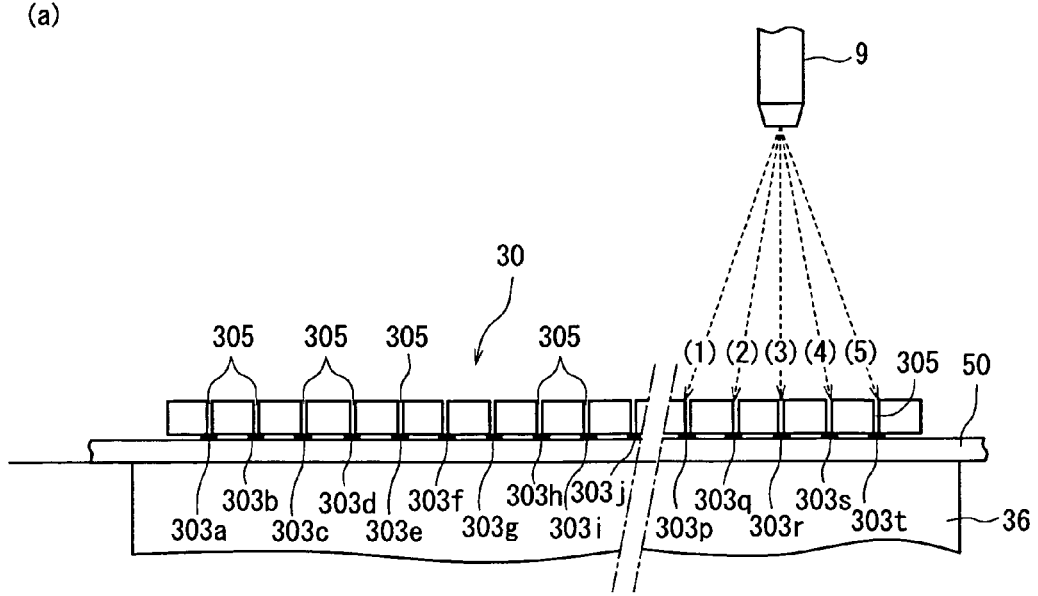
FIGS. 9(a) and 9(b) are explanatory diagrams showing another cycle of the drilling step which is carried out by the laser beam processing machine shown in FIG. 1.
Figure 9:
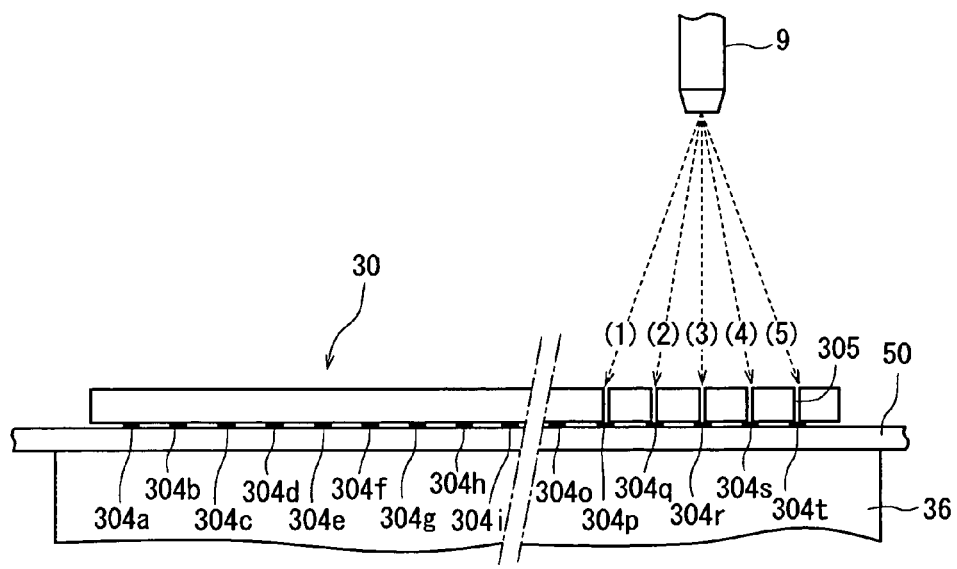

By carrying out the above drilling step on the electrodes 303 formed on the other devices 302 in the row E1 of the semiconductor wafer 30, via holes 305 reaching the electrodes 303 (303a to 303t) can be formed in the portions corresponding to the electrodes 303 (303a to 303t) formed on all the devices 302 in the row E1 as shown in FIG. 9(a). Then, the controller 20 controls the above first indexing-feed means 38 to move the chuck table 36 in the indexing-feed direction perpendicular to the sheet in FIG. 9(a). Meanwhile, the controller 20 receives a detection signal from the read head 384b of the indexing-feed amount detection means 384 and counts the detection signals by means of the counter 204. When the count value of the counter 204 reaches a value corresponding to the interval C in the Y direction in FIG. 4 between the electrodes 303 and 304, the operation of the first indexing-feed means 38 is suspended to stop the movement of the chuck table 36 in the indexing-feed direction. As a result, the condenser 9 is positioned right above the above electrode 304r as shown in FIG. 9(b). Then, by carrying out the above drilling step, via holes 305 reaching the electrodes 304t to 304p are formed in the portions corresponding to the electrodes 304t to 304p of the semiconductor wafer 30 as shown in FIG. 9(b). Thus, the via holes 305 reaching the electrodes are formed in the portions corresponding to the electrodes 303 (303a to 303t) and 304 (304a to 304t) on all the devices 302 formed on the semiconductor wafer 30.

What is claimed is:

1. A laser beam processing machine comprising a chuck table for holding a workpiece, a laser beam application means for applying pulse laser beams to the workpiece held on the chuck table, a processing-feed means for moving the chuck table and the laser beam application means relative to each other in a processing-feed direction (X direction), a X-direction position detection means for the chuck table, and a controller for controlling the laser beam application means and the processing-feed means based on a detection signal from the X-direction position detection means, wherein
the laser beam application means comprises a laser beam oscillation means for providing the pulse beams, an optical axis changing means for deflecting the optical axis of the beams in the processing-feed direction, and a condenser for converging beams that have been deflected by the optical axis changing means;
the controller comprises a memory for storing a plurality of processing position coordinates set in the workpiece, and controls the optical axis changing means according to a duration of the pulse of each beam; and
the controller causes the optical axis changing means to direct one pulse of one beam to one processing position coordinate and then deflect an angle of the beams so that the next pulse is directed to an adjoining processing position coordinate until a beam has been deflected to each of a predetermined plurality of processing position coordinates, and to repeat application of one beam for one pulse and deflection to the adjoining processing portion coordinate a plurality of times until a via hole is formed at each processing position coordinate of the predetermined plurality of coordinates.

2. The laser beam processing machine according to claim 1, wherein the optical axis changing means is composed of an acousto-optic deflection means which comprises an acousto-optic device, an RF oscillator for applying RF to the acousto-optic device, and a deflection angle adjustment means for adjusting the frequency of RF outputted from the RF oscillator.

3. The laser beam processing machine according to claim 1, wherein the controller obtains the smallest integer (M) which satisfies X<(1 sec/N)×M if X>(1 sec/N) and determines the number of predetermined processing position coordinates to be processed as M (wherein N (Hz) is the repetition frequency of a pulse laser beam oscillated from the laser beam oscillation means and X (sec) is the time interval).

4. The laser beam processing machine according to claim 1, wherein the time interval between pulses to the same processing position coordinates is set to 150 μs or more.

5. A laser beam processing machine comprising:
a chuck table for holding a workpiece;
a laser beam application means for applying a pulse laser beam to the workpiece held on the chuck table, the laser beam application means including a laser beam oscillation means for oscillating a pulse laser beam, an optical axis changing means for deflecting the optical axis of the pulse laser beam in a processing-feed direction, and a condenser for converging the pulse laser beam after deflection by the optical axis changing means;
a processing-feed means for moving the chuck table and the laser beam application means relative to each other in the processing-feed direction;
a position detection means for the chuck table; and
a controller for controlling the laser beam application means and the processing-feed means based on a detection signal from the position detection means, wherein
the controller includes a memory for storing a plurality of processing position coordinates on the workpiece, and controls the optical axis changing means according to the position coordinates and the frequency of the pulse laser beam to process n via holes in the workpiece at coordinate positions a1 through an on the workpiece respectively by:
successively deflecting the optical axis to apply one pulse of the beam, for a duration of a pulse interval, at each position coordinate, $a_i$, of position coordinates $a_i$ through $a_n$, and
until a via hole has been formed at each of coordinates $a_1$, $a_2$, ... $a_i$, ..., $a_n$, repeating deflecting of the optical axis and appling applying one pulse of the beam at each position coordinate $a_1$ through $a_n$ such that a time interval between the application of pulses at any position coordinate, $a_i$, will be sufficient to prevent melting of the workpiece at position coordinate, $a_i$.

6. The laser beam processing machine according to claim 5, wherein the controller sets the time interval to a sufficient duration to permit cooling of the workpiece at each position coordinate, $a_i$, such that an electrode, present on the workpiece beneath each such position coordinate, will not melt.

7. The laser beam processing machine according to claim 6, wherein the controller thereafter controls optical axis deflection and pulse application to process another group of via holes at position coordinates $a_1, a_2, \ldots a_m$ after completing the via holes at coordinate positions $a_1, a_2, \ldots a_n$.

8. The laser beam processing machine according to claim 5, wherein the optical axis changing means is composed of an acousto-optic deflection means which comprises an acousto-optic device for deflecting the optical axis, an RF oscillator for applying RF to the acousto-optic device, and a deflection angle adjustment means for adjusting the frequency of RF outputted from the RF oscillator.

9. The laser beam processing machine according to claim 5, wherein the controller obtains the smallest integer (M)

which satisfies X<(1 sec/N)×M if X>(1 sec/N) and determines the number of predetermined processing position coordinates to be processed as M (wherein N (Hz) is the repetition frequency of the pulse laser beam and X (sec) is the time interval).

10. The laser beam processing machine according to claim 6, wherein the time interval is 150 μs or more.

11. A laser beam processing method comprising:
holding a workpiece on a chuck table;
applying a pulse laser beam to the workpiece held on the chuck table by a laser beam application means that includes a laser beam oscillation means for oscillating a pulse laser beam, an optical axis changing means for deflecting the optical axis of the pulse laser beam in a processing-feed direction, and a condenser for converging the pulse laser beam after deflection by the optical axis changing means;
moving the chuck table and the laser beam application means relative to each other in the processing-feed direction by a processing-feed means;
providing a detection signal indicative of a position of the chuck table by a position detection means; and
controlling the laser beam application means and the processing-feed means by a controller based on a detection signal from the position detection means, and based upon a memory in the controller that stores a plurality of processing position coordinates on the workpiece,
said step of controlling the laser beam application means and the process-feed means including controlling the optical axis changing means according to the position coordinates and the frequency of the pulse laser beam to process n via holes in the workpiece at coordinate positions a1 through an on the workpiece respectively by:
successively deflecting the optical axis to apply one pulse of the beam, for a duration of a pulse interval, at each position coordinate $a_1$ through $a_n$; and
until a via hole has been formed at each of coordinates $a_1$, $a_2$, ... $a_i$, ... $a_n$, repeating deflecting of the optical axis and appling one pulse of the beam at each position coordinate $a_1$ through $a_n$ such that a time interval between the application of pulses at any position coordinate, $a_i$, will be sufficient to prevent melting of the workpiece at position coordinate, $a_i$.

12. The laser beam processing method according to claim 11, comprising setting the time interval to a sufficient duration to permit cooling of the workpiece at each position coordinate, $a_i$, such that an electrode, present on the workpiece beneath each such position coordinate, will not melt.

13. The laser beam processing method according to claim 12, comprising controlling the optical axis deflection and pulse application to process another group of via holes at position coordinates $a_1$, $a_2$, ... $a_m$ after completing the via holes at coordinate positions $a_1$, $a_2$, ... $a_n$.

14. The laser beam processing method according to claim 11, comprising obtaining the smallest integer (M) which satisfies X<(1 sec/N)×M if X>(1 sec/N) and determining the number of predetermined processing position coordinates to be processed as M (wherein N (Hz) is the repetition frequency of the pulse laser beam and X (sec) is the time interval).

15. The laser beam processing method according to claim 12, wherein the time interval is 150 μs or more.

* * * * *